United States Patent [19]

Tanno et al.

[11] 4,337,580

[45] Jul. 6, 1982

[54] METHOD FOR INSPECTING GEAR CONTACT PATTERNS

[75] Inventors: Takashi Tanno; Shigemitsu Koike, both of Hiroshima, Japan

[73] Assignee: Toyo Kogyo Co., Ltd., Hiroshima, Japan

[21] Appl. No.: 168,702

[22] Filed: Jul. 14, 1980

[30] Foreign Application Priority Data

Jul. 14, 1979 [JP] Japan ............................ 54-89457
Aug. 29, 1979 [JP] Japan ........................... 54-110851

[51] Int. Cl.³ .................... G01B 5/28; G01B 7/28; G01B 7/34
[52] U.S. Cl. ........................ 33/179.5 R; 33/1 S; 33/174 PC; 33/179.5 E
[58] Field of Search ............. 33/1 S, 1 BB, 174 L, 33/174 PA, 174 PC, 179.5 R, 179.5 D, 179.5 E

[56] References Cited

U.S. PATENT DOCUMENTS

| | | | |
|---|---|---|---|
| 3,849,892 | 11/1974 | Fabish et al. | 33/179.5 R |
| 3,950,858 | 4/1976 | Donner et al. | 33/179.5 R |
| 4,053,989 | 10/1977 | Yamaji et al. | 33/174 PC |
| 4,166,323 | 9/1979 | Maag | 33/179.5 R |
| 4,276,699 | 7/1981 | Sterki et al. | 33/179.5 R |
| 4,276,700 | 7/1981 | Tanno et al. | 33/179.5 R |

FOREIGN PATENT DOCUMENTS

| | | | |
|---|---|---|---|
| 52-32359 | 3/1977 | Japan | 33/179.5 R |
| 2043912 | 10/1980 | United Kingdom | 33/179.5 R |

*Primary Examiner*—Richard R. Sterns
*Attorney, Agent, or Firm*—Fleit & Jacobson

[57] ABSTRACT

In a gear tooth having a tooth surface, the gear contact pattern is inspected by the steps of measuring the tooth surface at regularly positioned measuring points to detect deviations from a standard gear profile at corresponding measuring points and counting the number of such measuring points wherein the deviations are within a predetermined limit. Where the counted number is greater than a predetermined value, the tooth surface is accepted.

20 Claims, 13 Drawing Figures

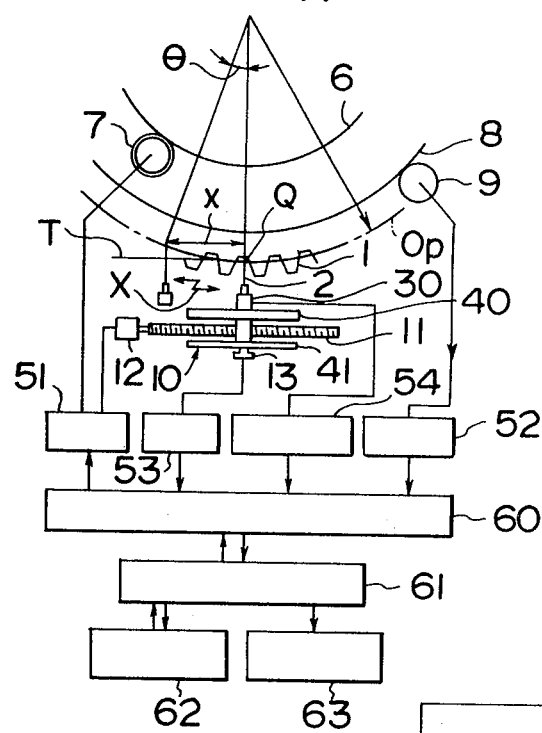
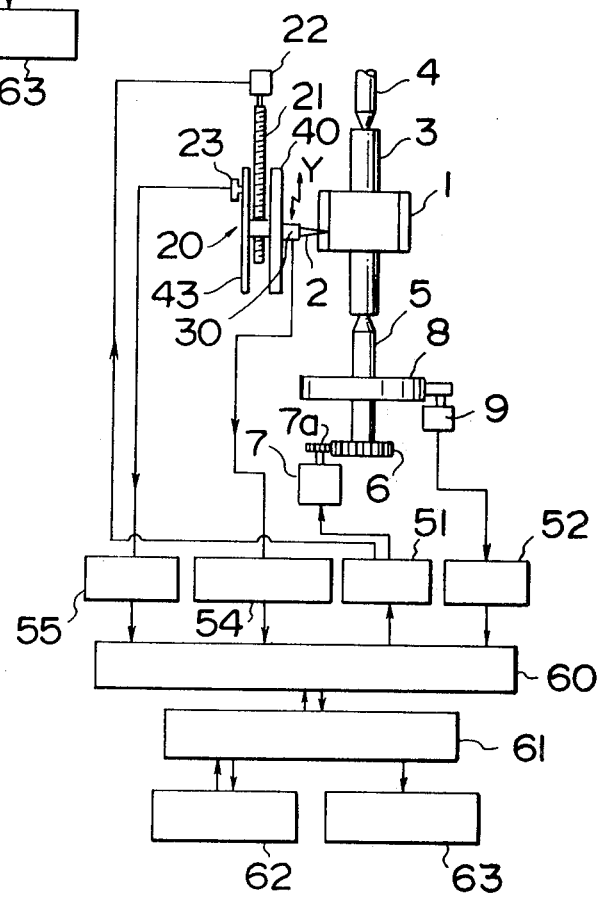

F I G.12
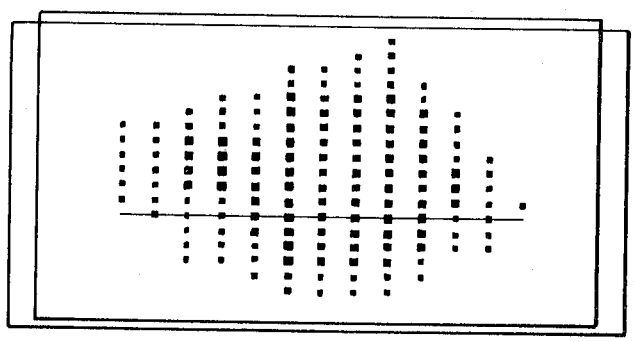
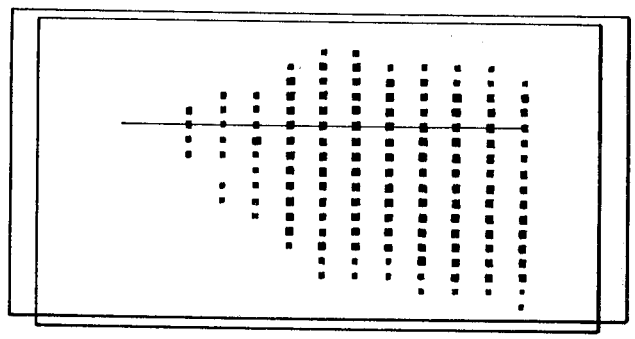

METHOD FOR INSPECTING GEAR CONTACT PATTERNS

The present invention relates to gear manufacturing, and more particularly to a method for inspecting gear contact patterns.

In general, processes for gear manufacturing are under a strict control, however, since there are various factors such as quenching conditions which may have influence on the quality of products, gears manufactured in one lot may be of different quality from those in other manufacturing lots. It has thus been required to have the gears in each manufacturing lot inspected for quality. Particularly, in case of gears that are to be driven under a high speed, it is very important to inspect the gear contact patterns because a poor contact between mutually meshing gear teeth surfaces may often cause damages of the gear teeth and produce an unacceptably high noise.

Conventionally, in order to inspect the gear contact patterns, there has been provided a master or reference gear which is adapted to be applied with paint and brought into a meshing engagement with a gear to be tested. Thus, the paint on the master gear is partially transferred to the gear to be tested and the transferred paint pattern is visually inspected as representing the gear contact pattern. It should however be pointed out that the conventional method is not sufficiently precise because the accuracy of the master gear as well as the thickness of the paint coating have influences on the result of the inspection.

It is therefore an object of the present invention to provide a method for inspecting a gear contact pattern with a high preciseness.

Another object of the present invention is to provide a method for inspecting a gear contact pattern without using a painting process.

A further object of the present invention is to provide a method for inspecting a gear contact pattern by comparing an actual gear profile with a standard one to determine whether or not the actual gear profile is within an acceptable limit.

Still further object of the present invention is to provide a convenient method for selecting a gear which will have acceptable contact patterns with another gear even when one or both of the gears have profiles which are out of the acceptable limit when they are compared with the standard profile.

According to the present invention, the above and other objects can be accomplished by a method for inspecting a gear contact pattern which comprises steps of measuring a gear tooth having a tooth surface at a plurality of regularly located measuring points on the surface to detect deviations of the gear tooth from a standard tooth profile at the measuring points, determining a reference which is the deviation of maximum positive value, counting number of the measuring points of which deviations are within a predetermined limit from the reference, determining a gear contact ratio which is a ratio of area of contact to the tooth surface on the basis of a ratio of the number of the measuring points, of which deviations are within the predetermined limit, to the total number of the measuring points so as to select gears in which the gear contact ratio is above a predetermined value. In a preferable aspect of the present invention, the aforementioned process is preceded by a preliminary measuring process which comprises steps of selecting a plurality of gear teeth in a single gear, measuring each of the gear teeth at a plurality of regularly located measuring points to detect deviations of the gear tooth from a standard tooth profile at the measuring points, obtaining mean values of the deviations of the selected gear teeth at the respective measuring points, and selecting among the gear teeth a specific gear tooth of which deviations are closest to the mean values to put it to the aforementioned inspection.

In a further preferable aspect of the present invention, there is provided a method for obtaining an acceptable pair of gears even when one or both of the gears are found unacceptable through the aforedescribed inspection. For the purpose, the teeth profiles of a pair of gears are measured at a plurality of regularly located measuring points in terms of deviations with respect to a standard tooth profile, and the deviations in one gear are compared with corresponding deviations in the other gear to detect relative deviations at the measuring points between the pair of gears. Then, counting is conducted on the number of measuring points wherein the relative deviations are within a predetermined limit, and the pair of gears are judged as acceptable where the counted number of such measuring points is greater than a predetermined value.

In a still further aspect of the present invention, a gear tooth surface is divided into a plurality of zones, such as four triangular corner zones and a diamond-shaped center zone. The number of measuring points wherein the deviations are within the acceptable limit is counted in each of such zones so as to detect the distribution of acceptable measuring points. The gear may be classified in accordance with the distribution of such acceptable measuring points, and such classification is useful in locating an acceptable pair of gears.

The above and other objects and features of the present invention will become apparent from the following descriptions of preferred embodiments taking reference to the accompanying drawings, in which:

FIG. 1 is a diagrammatical front view of a gear inspection device in accordance with one embodiment of the present invention;

FIG. 2 is a diagrammatical side view of the gear inspection device shown in FIG. 1;

FIG. 6(*b*) is a diagram similar to FIG. 6(*a*) but showing the deviations from a reference;

FIG. 12 shows the distributions of acceptable measuring points when the gear in FIG. 8 is meshed with the gear in FIG. 10.

Figure 3:
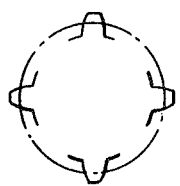
FIG. 3 is a front view of a gear showing one example of selection of gear teeth for a preliminary inspection.
Figure 4:
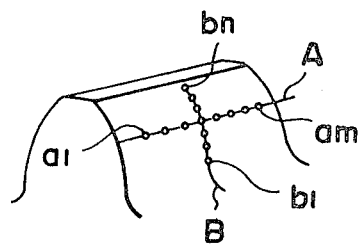
FIG. 4 is a perspective view of a gear tooth showing the measuring points for the preliminary inspection.

Referring now to the drawings, particularly to FIGS. 1 and 2, there is shown a device for inspecting a gear. In the specific example, a spur gear 1 is being inspected. The device includes a detecting probe 2 which extends radially with respect to the gear 1 and has a tip end adapted to be brought into contact with a tooth of the gear 1. As shown in FIG. 2, the gear 1 is carried by a shaft 3 which is coaxial with the gear 1 and supported at the opposite ends by axially aligned shafts 4 and 5. The shaft 5 has a driven gear 6 which is secured thereto and in meshing engagement with a pinion 7a on an output shaft of a pulse motor 7 so that the shaft 5 and thus the gear 1 are incrementally driven by the pulse motor 7. The shaft 5 is further provided with an indexing disc 8 which cooperates with a rotary encoder 9 for detecting the angular position of the gear 1 in terms of a digital pulse signal.

The detecting probe 2 is mounted on a detector 30 which is in turn mounted on a carriage 40 carried by an X-direction transfer mechanism 10 and a Y-direction transfer mechanism 20 so that the probe 2 can be driven for incremental movements in both the X and Y directions. As shown in FIG. 1, the transfer mechanism 10 comprises a drive screw shaft 11 which is driven by a pulse motor 12. Similarly, the transfer mechanism 20 comprises a drive screw shaft 21 which is driven by a pulse motor 22.

The carriage 40 is provided with an X-direction rod 41 which cooperates with a linear encoder 13 for detecting the movement x of the detecting probe 2 in the X-direction or the direction parallel with a tangent line T drawn on the base circle Op at the reference point Q as shown in FIG. 1. The carriage 40 is further provided with a Y-direction rod 43 which cooperates with a linear encoder 23 for detecting the movement y of the probe 2 in the Y-direction or the direction parallel with the axis of the gear 1 as shown in FIG. 2. The detector 30 support the base portion of the probe 2 so as to bias the probe 2 into contact with the tooth surface of the gear 1, and functions to produce an analogous signal representing the amount of linear and/or angular displacement of the probe 2 whereby the actual position of the tip of the probe 2 can be detected.

In actual operation, when it is desired to inspect for example a normal tooth profile, the pulse motor 7 for driving the gear 1 and the pulse motor 12 for driving the probe 2 in the X-direction are synchronously energized so that the spur gear 1 is incrementally rotated in the clockwise direction and the detecting probe 2 is incrementally driven in the X-direction. The angle $\theta$ of rotation of the spur gear 1 is detected by a counter 52 which receives signals from the rotary encoder 9. The output of the counter 52 is applied through an interface 60 to a computer 61. The amount of X-direction movement x of the probe 2 is detected by a counter 53 which receives digital signals from the linear encoder 13. The output of the counter 53 is applied through the interface 60 to the computer 61. In a standard tooth profile, the relationship between the amount x of the X-direction movement of the probe 2 and the angle $\theta$ of the rotation of the gear 1 is represented by $x = R \cdot \theta$, where R is the radius of the base circle Op.

In order for detecting the actual position of the tip of the probe 2, the analogous signal from the detector 30 is applied to an A/D converter 54 which converts the analoguous signal into a digital signal and applies its output signal through the interface 60 to the computer 61. The Y-direction movement y of the probe 2 may be detected as desired by a counter 55 which receives signals from the linear encoder 23 and applies its output through the interface 60 to the computer 61. The output of the computer 61 is connected with a printer 62 and an X-Y plotter 63.

The inspection of the gear contact pattern may be carried out in accordance with the following procedure.

(I) Selection of Teeth Surfaces for a Preliminary Inspection (a) Sampling of a Gear A gear is at first taken out randomly for inspection from a single manufacturing lot.

(b) Selection of Gear Teeth

As shown in FIG. 3, four gear teeth may be selected for preliminary inspection. The selected gear teeth may be the ones which are angularly spaced apart from each other by 90°.

(c) Preliminary Inspection

With respect to each of the selected gear teeth, measuring points $a_1, a_2 - - - a_m; b_1, b_2 - - - b_n$ are determined respectively along a line A which is an intersection of the base circle Op on the tooth surface and a line B which is the intermeshing center line on the tooth surface. Along the line A, the points $a_1, a_2 - - - a_m$ are equally spaced. Similarly, the points $b_1, b_2 - - - b_n$ are also equally spaced along the line B.

At the respective measuring points, the tooth surface is detected in terms of the position of the tip of the probe 2. The results of the measurements are applied to the computer 61 and an operation is carried out to determine the deviations $h(a_1), h(a_2) - - - h(a_m); h(b_1), h(b_2) - - - h(b_n)$ of the tooth surface from the standard tooth profile at respective measuring points. The measurements are made on all of the selected gear teeth and a mean value of the deviations is calculated among the selected gear tooth with respect to each of the measuring points.

(d) Selection of a Gear Surface for Final Inspection

Among the teeth surfaces of the selected gear teeth, selection is made of one surface of which deviations are closest to the mean values of the deviations to put the particular surface into the final inspection. In actual practice, the selection of tooth surface may be made in a simpler way by choosing a limited number of measuring points. For example, where there are 200 measuring points $a_1, a_2 - - - a_{200}$ along the line A and 100 measuring points $b_1, b_2 - - - b_{100}$ along the line B, the points $a_{40}, a_{160}; b_{20}, b_{80}$ may be selected. Then, the difference between the deviations at the points $a_{40}$ and $a_{160}$, and between the deviations at the points $b_{20}$ and $b_{80}$ are calculated in each tooth surface. At the same time, mean values of the deviations at the points $a_{40}, a_{160}, b_{20}$ and $b_{80}$ are respectively calculated to obtain the differences between the mean values at the points $a_{40}$ and $a_{160}$ and between the mean values at the points $b_{20}$ and $b_{80}$. Thereafter, the difference between the mean values of the deviations at the points $a_{40}$ and $a_{160}$ is compared with the difference between the deviations at the points $a_{40}$ and $a_{160}$ in each of the selected teeth surfaces to obtain a difference therebetween, which may be referred to as an "axial gradient difference". Similarly, the difference between the mean values of the deviations at the points $b_{20}$ and $b_{80}$ is compared with the difference between the deviations at the points $b_{20}$ and $b_{80}$ in each of the selected teeth surfaces to obtain a difference therebetween, which may be referred to as a "radial gradient difference". With respect to each of the selected teeth surfaces, the axial gradient difference is added to the radial gradient difference and the sum of such differences is compared with those of the other teeth surfaces. The tooth surface which has the smallest value of such sum is selected for the final inspection.

(II) Final Inspection (a) Measuring Points

Figure 5:
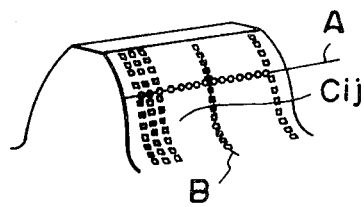
FIG. 5 is a perspective view of a gear tooth showing the measuring points for the final inspection.

As shown in FIG. 5, measuring matrix points $C_{ij}=$ ($i=1---m; j=1---n$) are determined along equi-spaced lines parallel with the line A and equi-spaced lines parallel with the line B and the detecting probe 2 is moved to these measuring points to carry out the measurement.

(b) Measurement of Deviations at Respective Measuring Points

Figure 6A:
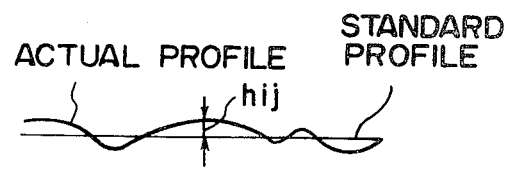
FIG. 6(*a*) shows an example of deviations of a tooth profile from a standard profile.

The results of the measurements at the respective measuring points $C_{ij}$ are compared in the computer 61 with the standard profile to obtain deviations hij therefrom as shown in FIG. 6(a).

(c) Calculation of Gear Contact Pattern

Figure 6B:
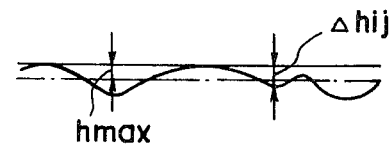

As shown in FIG. 6(b), the maximum positive deviation $h_{max}$ is taken as the reference, and the deviations at the respective points are compared with the reference value to obtain values of depression $\Delta hij = h_{max} - hij$. Then, counting is made of the number P of the measuring points wherein the values of depression $\Delta hij$ are within a predetermined limit $\Delta h$ to calculate a ratio $\gamma$ of the number P to the total number N of the measuring points. The ratio $\gamma$ is considered as representing the area of the tooth surface which will be brought into contact with the cooperating tooth surface.

(d) Judgement

The aforementioned ratio $\gamma$ of the number P to the number N is compared with a predetermined limit $\gamma_o$ which may be 0.30 and, where the ratio is greater than the limit $\gamma_o$, the gear is accepted.

Figure 7:
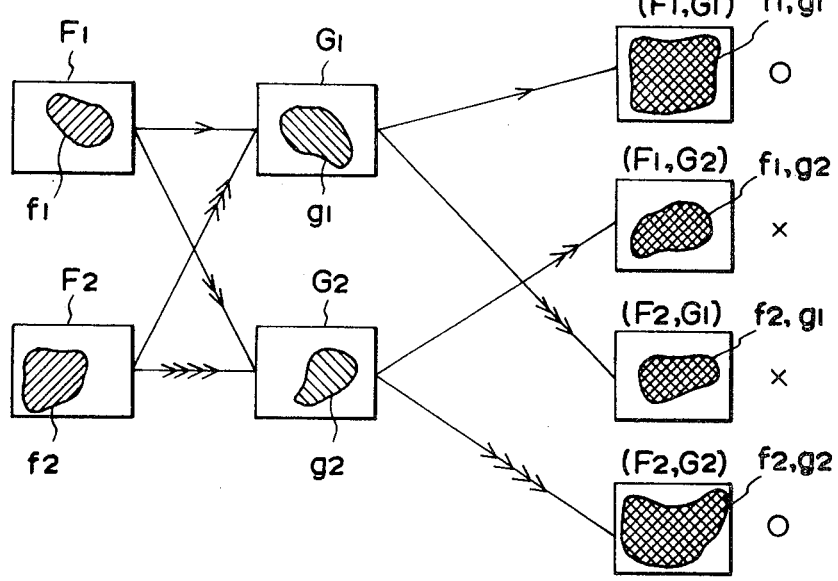
FIG. 7 is a diagram showing the principle of selection of an acceptable pair of gears.

The limit values $\Delta h$ and $\gamma_o$ may be determined in accordance with the materials and applications of the gears. In case of automobile applications, particularly in transmission gears, the value $\Delta h$ may be approximately 6 microns, preferably 2 microns, and the value $\gamma_o$ may be approximately 0.30, preferably 0.60. In the above embodiment, the inspection device includes only one detecting probe, however, a plurality of probes may of course be provided. From the viewpoint of accuracy of the measurement, the spacing between the adjacent measuring points should be as small as possible, however, the spacing should be determined taking the measuring time into consideration.

Where the gears are found unacceptable through the aforementioned procedure, they may be subjected to a second judgement with the results of the previous measurement. Referring to FIG. 7, there is shown an example wherein a F-type gear is to be meshed with a G-type gear. For the F-type gears, there may be rejected gears $F_1$ and $F_2$ which have contact areas $f_1$ and $f_2$, respectively. Similarly, for the G-type gears, there may be rejected gears $G_1$ and $G_2$ having contact areas $g_1$ and $g_2$, respectively. There are four possibilities of combinations ($F_1$, $G_1$), ($F_1$, $G_2$), ($F_2$, $G_1$) and ($F_2$, $G_2$) of F-type and G-type gears as shown in FIG. 7 and in these combinations the contact areas will be as shown by ($f_1-g_1$), ($f_1-g_2$), ($f_2-g_1$) and ($f_2-g_2$). Where the ratio of each of these contact areas to the total area of the tooth surface is greater than the aforementioned predetermined limit, the combination of the gears is accepted. In the example shown in FIG. 7, the combinations ($F_1$, $G_1$) and ($F_2$, $G_2$) are acceptable.

In general, when a rejected gear of one type is combined with a rejected gear of another type, the contact area is in most cases increased, however, there may be a combination wherein the contact area is decreased. Where there are several possibilities of combinations of rejected gears, it is preferable at first to find an acceptable combination of gears which have least possibilities of getting a compatible cooperating gear. For example, where gears in the gear groups $G_1$ through $G_5$ are to be combined with gears in the gear groups $F_m$ and $F_n$ and where the gears in the group $F_m$ can well be combined with gears in anyone of the groups $G_1$ through $G_5$ but the gears in the group $F_n$ can be combined only with the gears in the group $G_1$ to obtain acceptable pairs of gears, the gears in the group $F_n$ may be combined at first with the gears in the group $G_1$, leaving the gears in the group $F_m$ for use with other gear group of G-type which has less possibility of getting compatible cooperating gears.

For the second judgement, the following procedures may be followed.

(i) Based on the deviations hij and h'ij at the measuring points Cij and C'ij, respectively, on the teeth surfaces of the gears of F-type and G-type, a relative distance $\delta ij$ is obtained from an equation $\delta ij = l_o - hij - h'ij$, where $l_o$ is the distance between the intermeshing teeth surfaces of standard profiles.

(ii) Then, counting is made of the number k of the combinations of the measuring points (Cij, C'ij) wherein the relative distance $\delta ij$ are within a predetermined range between $\delta$ and $\delta + \Delta$. In case of automobile gears, the value $\Delta$ is approximately 6 microns, and should preferably be 2 microns. The number k is compared with the total number N ($=m \times n$) of the combinations of the measuring points and the ratio q of the number k to the number N is calculated. Where the ratio q is not smaller than a predetermined value $\alpha$, the combination of the gears is accepted. The value $\alpha$ may be determined in accordance with the materials and applications of the gears. In case of automobile gears, particularly transmission gears, the value $\alpha$ should be approximately 0.50.

Figure 9:
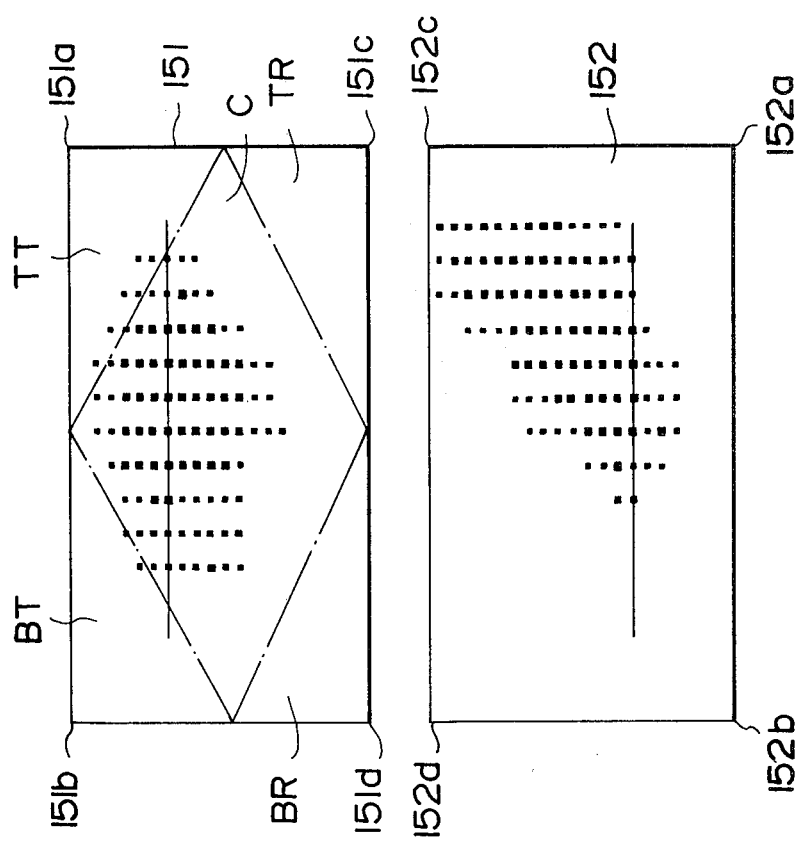
FIG. 9 shows an example of distributions of acceptable measuring points on the teeth surfaces of the ring gear shown in FIG. 8.
Figure 8:
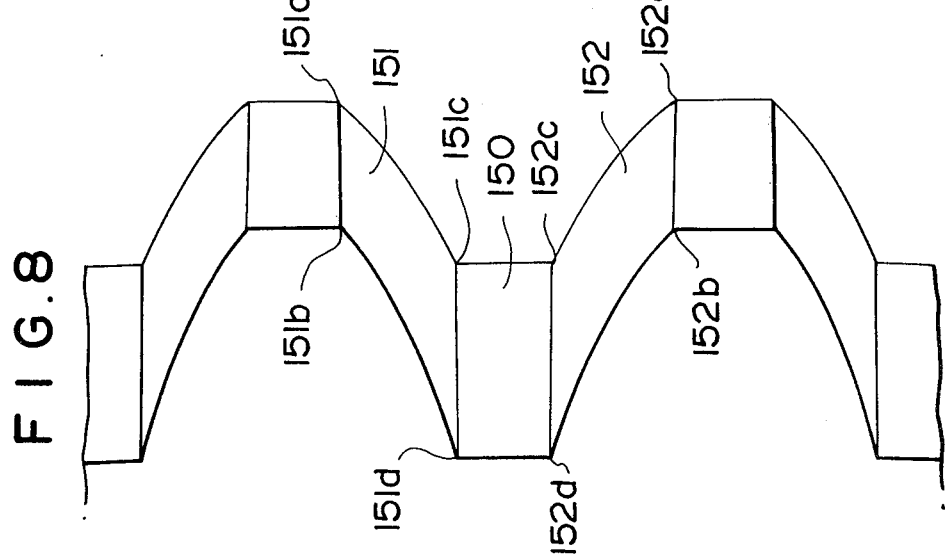
FIG. 8 is a fragmentary perspective view of a ring gear to which the method of the present invention is being applied.

Referring now to FIGS. 8 through 12, there is shown a further embodiment of the present invention. FIG. 8 shows a ring gear 150 having a drive side tooth surface 151 and a coast side tooth surface 152. The tooth surface 151 has a top side tip corner 151a, a bottom side tip corner 151b, a top side root corner 151c and a bottom side root corner 151d. Similarly, the tooth surface 152 has a top side tip corner 152a, a bottom side tip corner 152b, a top side root corner 152c and a bottom side root corner 152d. As shown in FIG. 9, the tooth surface 151 is divided into four triangular corner zones TT, BT, TR and BR and a diamond shaped center zone C. Black dots show measuring points wherein the deviations are within the acceptable limit. In this embodiment, the number of the black dots is counted in each zone. Since the center zone C is four times in area as large as the corner zone, the number of the black dots in the zone C is divided by four. The tooth surface is classified by the zone wherein the counted number is the largest. For example, where the counted number is largest in the zone C, the tooth surface is referred to as the type C. Similarly, the types TT, BT, TR and BR are defined where the counted numbers are the largest in the zones TT, BT, TR and BR, respectively. Where the counted numbers are the same in two or more areas, preference is taken in the order C, TT, BT, TR and BR. For example, where the counted numbers are the same in the zones C and TT, the tooth surface is referred to as the type C. Where the counted numbers are the same in the zones TR and BR, the tooth surface is referred to as as the type TR.

The tooth surface of type C is judged as being acceptable. In the example shown in FIG. 9, the surface 151 is of the type C whereas the surface 152 is of the type TR.

Figure 11:
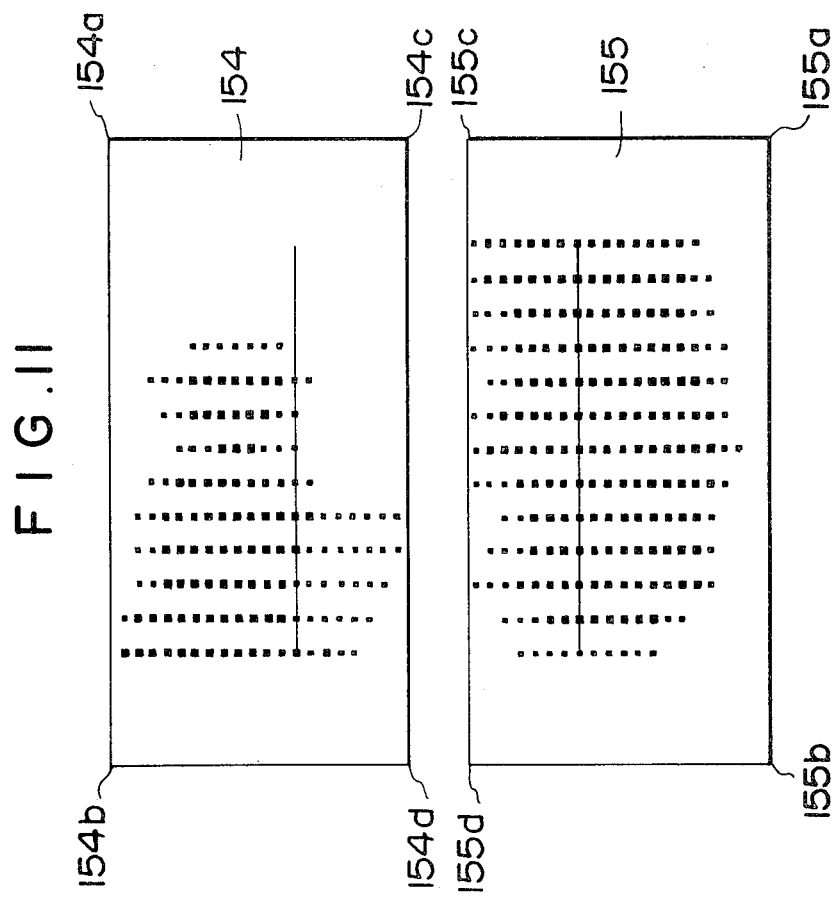
FIG. 11 shows an example of distributions of acceptable measuring points on the teeth surfaces of the gear shown in FIG. 10.
Figure 10:
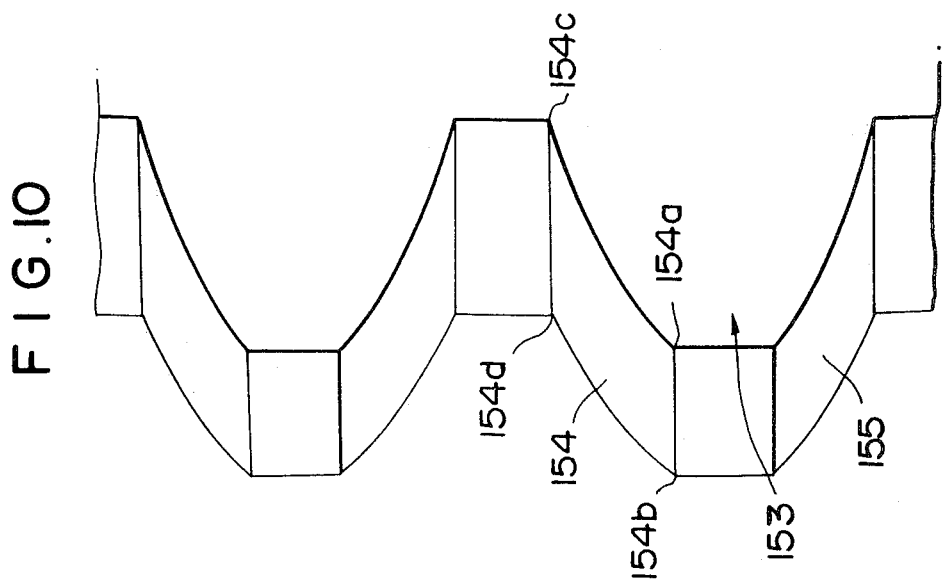
FIG. 10 is a fragmentary perspective view of a main shaft gear to which the method of the present invention is being applied.

Referring to FIGS. 10 and 11, there is shown a main shaft gear 153 having a driving side tooth surface 154 and a coast side tooth surface 155. The tooth surface 154 has a top side tip corner 154a, a bottom side tip corner 154b, a top side root corner 154c and a bottom side root corner 154d. Similarly, the tooth surface 155 has a top side tip corner 155a, a bottom side tip corner 155b, a top side root corner 155c and a bottom side root corner 155d. In this example, the tooth surface 154 is of the type BR, whereas the tooth surface 155 is of the type C.

When the gears 150 and 153 are meshed with each other, the combination of the tooth surfaces becomes the one of type C as shown in FIG. 12. It should therefore be judged that the combination of the gears 150 and 153 are acceptable. It has been found that a type C combination can very often be obtained by a combination of the tooth surface types as shown in the table.

TABLE

| COMBINATION OF TOOTH SURFACES | |
|---|---|
| TYPE | COOPERATING TOOTH SURFACES |
| C | C, BT, BR, TT, TR |
| BT | C, TT |
| BR | C, TR |
| TT | C, BT |
| TR | C, BR |

The invention has thus been shown and described with reference to specific examples, however, it should be noted that the invention is in no way limited to the details of these examples but changes and modifications may be made without departing from the scope of the appended claims.

We claim:

1. Method for inspecting a gear contact pattern on a tooth surface of a gear tooth of a gear which comprises the steps of determining on the tooth surface of the gear tooth a plurality of regularly located measuring points, establishing a standard tooth profile for the measuring points, measuring the tooth surface at the measuring points to detect deviations of the tooth surface from the standard tooth profile at the measuring points, determining a reference which is the deviation of maximum positive value, counting the number of the measuring points of which deviations are within a predetermined limit of the reference, determining a gear contact ratio which is a ratio of the counted number of the measuring points to the total number of the measuring points so as to select gears in which the gear contact ratio is above a predetermined value.

2. Method in accordance with claim 1 in which said measuring points are in a equi-spaced matrix pattern.

3. Method in accordance with claim 1, said method being applied for inspecting a gear contact pattern in a gear for automobile use, said predetermined limit of the deviation from the reference being 6 microns.

4. Method in accordance with claim 3 in which said predetermined value of the gear contact ratio is 0.30.

5. Method for inspecting a gear contact pattern in accordance with claim 1 in which an unselected gear is paired with another type of unselected gear which is to be meshed with the first mentioned unselected gear, said method further comprising the steps of comparing the deviations in one gear with corresponding deviations in the other gear to detect relative deviations at the measuring points between the pair of gears, counting the number of measuring points wherein the relative deviations are within a predetermined limit and judging the pair of gears as acceptable where the counted number of such measuring points is greater than a predetermined value.

6. Method in accordance with claim 5 in which said measuring points are in a equi-spaced matrix pattern.

7. Method in accordance with claim 5, said method being applied for inspecting a gear contact pattern in gears for automobile use, said predetermined limit of the reference and said predetermined limit of the relative deviation being 6 microns.

8. Method in accordance with claim 7 in which said predetermined value of the gear contact ratio is 0.30 and said predetermined value of the counted number of the measuring points is 0.50.

9. Method for inspecting a gear contact pattern on a tooth surface of a gear tooth of a gear which comprises the steps of determining on the tooth surface of the gear tooth a plurality of regularly located measuring points, establishing a standard tooth profile for the measuring points, measuring the tooth surface at the measuring points to detect deviations of the tooth surface from the standard tooth profile at the measuring points, determining a reference which is the deviation of maximum positive value, dividing the tooth surface into four triangular corner zones and a diamond-shaped center zone, counting the number per unit area in each zone of the measuring points of which deviations are within a predetermined limit from the reference, and accepting the tooth surface when the counted number in the center zone is not less than that in the other zones.

10. Method in accordance with claim 9 in which an unselected gear is paired with another type of unselected gear which is to be meshed with the first mentioned unselected gear, said method further comprising the steps of comparing the deviations in one gear with corresponding deviations in the other gear to detect relative deviations at the measuring points between the pair of gears, counting the number per unit area in each zone of measuring points wherein the relative deviations are within a predetermined limit, and judging the pair of gears as acceptable where the counted number in the center zone is not less than that in the other zones.

11. Method for inspecting a gear contact pattern on a tooth surface of a gear tooth of a gear comprising a preliminary measuring process which comprises the steps of selecting a plurality of gear teeth in a single gear, measuring each of the gear teeth at a plurality of regularly located measuring points to detect deviations of the gear tooth from a standard tooth profile at the measuring points, obtaining mean values of the deviations of the selected gear teeth at the respective measuring points, and selecting among the gear teeth a specific gear tooth which has the largest number of measuring points where deviations are closest to the mean values; and a final measuring process which comprises the steps of determining on a tooth surface of the selected gear tooth a plurality of regularly located measuring points, measuring the tooth surface at the measuring points to detect deviations of the tooth surface from a standard tooth profile at the measuring points, determining a reference which is the deviation of maximum positive value, counting the number of the measuring points of which deviations are within a predetermined limit from the reference, determining a gear contact ratio which is a ratio of the counted number of the measuring points to the total number of the measuring points so as to select gears in which the gear contact ratio is above a predetermined value.

12. Method in accordance with claim 11 in which said measuring points are in a equi-spaced matrix pattern.

13. Method in accordance with claim 11, said method being applied for inspecting a gear contact pattern in a gear for automobile use, said predetermined limit of the deviation from the reference being 6 microns.

14. Method in accordance with claim 11 in which said predetermined value of the gear contact ratio is 0.30.

15. Method in accordance with claim 11 in which an unselected gear is paired with another type of unselected gear which is to be meshed with the first mentioned unselected gear, said method further comprising the steps of comparing the deviations in one gear with corresponding deviations in the other gear to detect relative deviations at the measuring points between the pair of gears, counting the number of measuring points wherein the relative deviations are within a predetermined limit and judging the pair of gears as acceptable where the counted number of such measuring points is greater than a predetermined value.

16. Method in accordance with claim 15 in which said measuring points are in a equi-spaced matrix pattern.

17. Method in accordance with claim 15, said method being applied for inspecting a gear contact pattern in gears for automobile use, said predetermined limit of the reference and said predetermined limit of the relative deviation being 6 microns.

18. Method in accordance with claim 17, in which said predetermined value of the gear contact ratio is 0.30 and said predetermined value of the counted number of the measuring points is 0.50.

19. Method for inspecting a gear contact pattern on a tooth surface of a gear tooth of a gear comprising a preliminary measuring process which comprises the steps of selecting a plurality of gear teeth "a" in a single gear, measuring each of the gear teeth at a plurality of regularly located measuring points to detect deviations of the gear tooth from a standard tooth profile at the measuring points, obtaining mean values of the deviations of the selected gear teeth at the respective measuring points, and selecting among the gear teeth a specific gear tooth which has the largest number of measuring points where deviations are closest to the mean values; and a final measuring process which comprises the steps of determining on a tooth surface of the selected gear tooth a plurality of regularly located measuring points, measuring the tooth surface at the measuring points to detect deviations of the tooth surface from a standard tooth profile at the measuring points, determining a reference which is the deviation of maximum positive value, dividing the tooth surface into four triangular corner zones and a diamond-shaped center zone, counting the number per unit area in each zone of the measuring points of which deviations are within a predetermined limit from the reference, and accepting the tooth surface when the counted number in the center zone is not less than that in the other zones.

20. Method in accordance with claim 19 in which an unselected gear is paired with another type of unselected gear which is to be meshed with the first mentioned unselected gear, said method further comprising the steps of comparing the deviations in one gear with corresponding deviations in the other gear to detect relative deviations at the measuring points between the pair of gears, counting the number per unit area in each zone of measuring points wherein the relative deviations are within a predetermined limit, and judging the pair of gears as acceptable where the counted number in the center zone is not less than that in the other zones.

* * * * *